United States Patent Office 3,043,431
Patented July 10, 1962

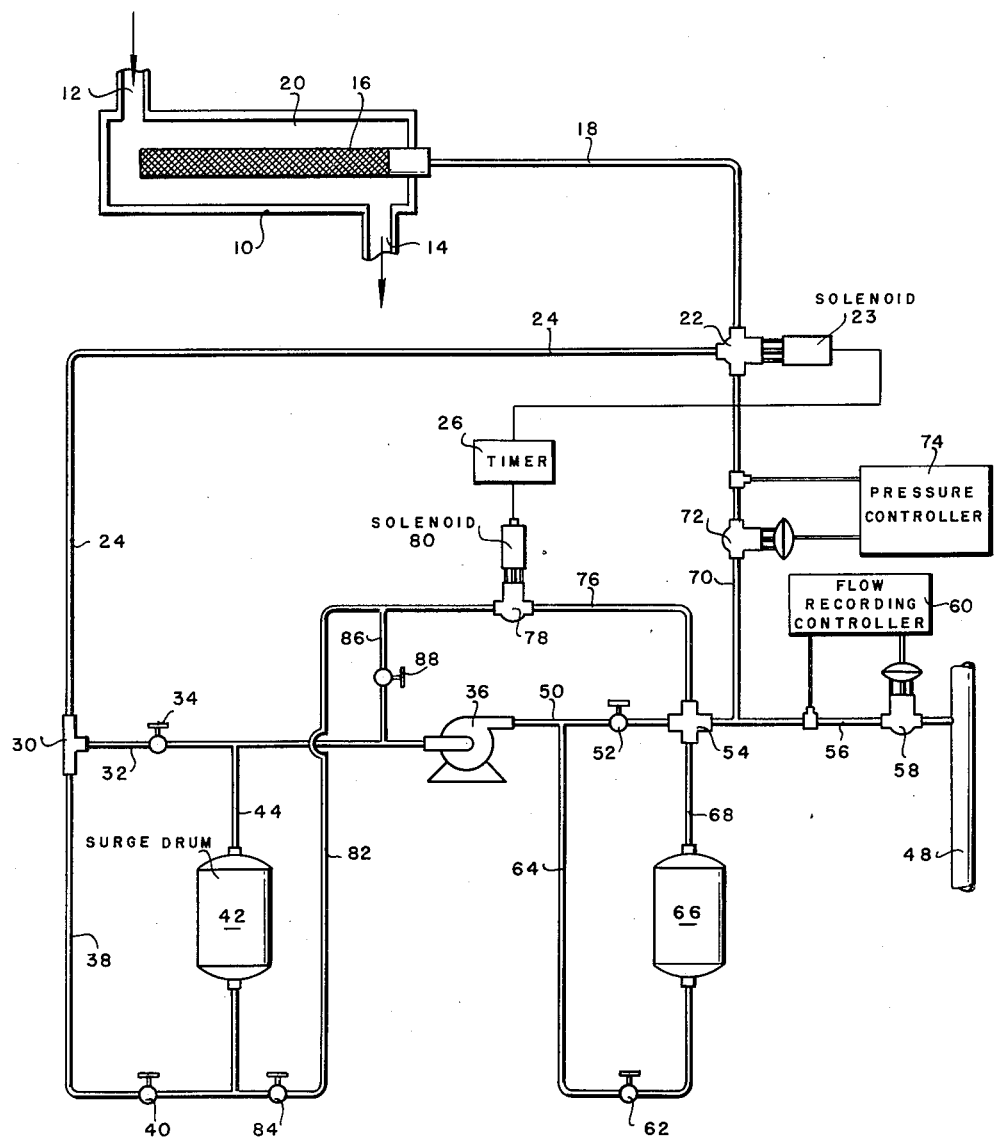

3,043,431
SLURRY FILTRATION
Arthur R. Dudley, Thomas H. Royder, and William D. Allison, Baytown, Tex., assignors, by mesne assignments, to Esso Research and Engineering Company, Elizabeth, N.J., a corporation of Delaware
Filed Apr. 23, 1959, Ser. No. 808,342
2 Claims. (Cl. 210—82)

This invention relates to a process for the filtration of slurries and to apparatus useful in the practice of the method. More particularly, this invention relates to a turbulent isothermal filtration process for the filtration of a suspension of solids in a liquid and to an improved combination of elements useful in practicing the method.

Substantially solids-free liquid may be removed from a slurry of a solid material in the liquid by a so-called "turbulent isothermal filtration process" wherein the slurry is caused to flow in a turbulent manner across the surface of a filter element whereby liquid is drawn through the filter element without building up a cake or coating of solid particles to any appreciable extent. Examples of slurries which may be filtered in this fashion include suspensions of wax crystals in a mother liquor consisting of a solvent solution of dewaxed oil, suspensions of crystals of an aromatic hydrocarbon (paraxylene) in a mother liquor comprising uncrystallized aromatic hydrocarbons, a suspension of finely divided clay particles in a lubricating oil fraction, a suspension of finely divided silica-alumina cracking catalyst particles in a petroleum hydrocarbon gas oil fraction, etc. Such a process, as applied to the treatment of crystallized hydrocarbons, is disclosed in U.S. Patent No. 2,820,070 to Bennett et al. entitled, "Method for Recovering Paraxylene." Such a filtration method, as applied to the treatment of a slurry of wax crystals in a slurry of dewaxed oil is shown in copending Moore and Royder application Ser. No. 643,096, filed February 28, 1957, entitled "Dewaxing of Oils," now Patent No. 2,914,456.

In order to conduct a turbulent isothermal filtration process efficiently, it is desirable to maximize the rate of withdrawal of liquid through the filter member. However, for a given velocity of slurry flow, the rate at which the filter elements will become blinded due to the entrapment of small solid particles or other extraneous materials increases when the rate of filtrate withdrawal is increased. As a consequence, when the filter element blinds, it becomes necessary to interrupt turbulent isothermal filtration operations in order to cleanse the filter element. The faster the element blinds, the shorter the filter cycle time between cleansing operations. Filter element cleansing operations consist of a warmup to melt entrapped wax, followed by cooling to approximately the slurry temperature. Since the cleansing operation is relatively time consuming, it reduces filter capacity and presents a serious problem in situations wherein the operating conditions promote rapid filter element blinding.

In accordance with the present invention, however, there is provided a method for materially inhibiting the rate of blinding of filter elements in a turbulent isothermal filtration zone which comprises periodically reversing the normal pressure differential existing across the filter element for short periods of time during continuous turbulent isothermal filtration operations in order to permit selective periodic reverse flow of filtrate through the filter member into the slurry to be filtered. As a consequence, the need for interrupting the turbulent isothermal filtration operations in order to cleanse the filter element by warmup is minimized.

The invention will be further illustrated in connection with the accompanying drawing wherein there is schematically shown one manner in which the method of the present invention may be practiced.

Turning now to the drawing, there is disclosed a turbulent isothermal filter comprising a housing 10 provided with a slurry inlet line 12 and a concentrated slurry discharge line 14. Arranged within the housing 10 is a hollow filter element 16 connected with a filtrate withdrawal line 18. Annulus 20 is defined by the housing 10 and the filter element 16. In conducting filtration operations, a dilute slurry of solids in liquid is charged to the filter 10 by way of a line 12 and caused to flow under turbulent isothermal conditions through the annular zone 20 intermediate the housing 10 and the filter element 16.

As a consequence, when a pressure differential is established, a portion of the liquid component of the slurry passes from the annulus 20 through the filter element 16 to the interior thereof for discharge.

A special discharge system is utilized in accordance with the present invention which is fluidly interconnected with filtrate discharge line 18. In the illustrated embodiment, filtrate line 18 leads to a suitable three-way valve, such as a valve 22 actuatable by a solenoid 23 which, in turn, is electrically coupled with a timer 26.

During normal operations, the setting of the valve 22 will be such that the line 18 will be fluidly interconnected with a primary filter withdrawal line 24 leading to a manifold 30. A line 32 controlled by a valve 34 may be provided for directly interconnecting manifold 30 with a pump 36. In the alternative, there may be provided a line 38 controlled by a valve 40 leading to a surge drum 42. In this case, the surge drum 42 is fluidly interconnected with the line 32 by a line 44.

The pump 36 constitutes a means to provide a desired low pressure area within the interior of the filter element 16 in order that liquid may positively be drawn from the annulus 20 through the surface of the filter element 16 to the interior thereof for discharge through line 18.

In accordance with the present invention, a pressure is imposed upon the filtrate downstream from the filtrate withdrawal means (e.g., pump 36) which is greater than the normal pressure within the annulus 20 of the filter 10. Therefore, the filtrate withdrawal means (e.g., pump 36) is sized to generate a pump discharge pressure which will work against and overcome this superimposed downstream pressure during normal filtration operations in order to permit removal of filtrate through the line 18.

In the illustrated embodiment the source of high pressure is a high pressure flow line 48 into which the filtrate is discharged. A fluid interconnection is provided intermediate the discharge end of the pump 36 and the line 48. Thus, the pump 36 is provided with a discharge line 50 controlled by a valve 52 leading to a manifold 54. A discharge line 56 fluidly interconnects the manifold 54 with the line 48, such line 56 being provided with suitable flow control means such as an automatically actuatable valve 58 regulated by a suitable mechanism such as a flow recording controller 60. In this situation, the flow recorder controller 60 may be utilized as a means for positively controlling the rate of withdrawal of filtrate through the line filter 18 in order that predetermined filtration conditions may be maintained.

As an alternative, the valve 52 in the pump discharge line 50 may be closed and a valve 62 in a branch line 64 leading to a holding drum 66 may be opened whereby the discharge from the pump 36 will be routed to the drum 66 and from thence by way of a line 68 to the manifold 54.

In accordance with the present invention, there is also provided a normally closed by-pass line 70 interconnecting the line 56 with the normally closed port of the three-way valve 22 whereby the pump 36 (which may be a positive displacement means) may be periodically bypassed in order to create a reverse pressure differential across the filtering element 16 in the turbulent isothermal filtration element 10. Preferably, the line 70 is provided with a back-pressure regulating valve 72 regulated by a suitable control member 74.

There is also provided a recycle line 76 for the pump 36 containing a flow control member 78. In its simplest form, the flow control member 78 is a simple restriction orifice (not shown) in the line 76. However, the flow control member is preferably a valve 78 which is provided with a valve control member 80. When an inlet surge tank 42 is to be utilized, the valve 78 may be interconnected with the charge line 38 for the tank 42 by way of a branch line 82 controlled by a valve 84. If the tank 42 is to be by-passed, the valve discharge line 82 may be directly interconnected with the pump charge line 32 by way of a branch line 86 controlled by a valve 88.

In addition, the control member 80 is electrically coupled with timer 26 so that the valves 22 and 78 may be simultaneously actuated.

*Operation*

In accordance with the embodiment shown in the drawings, normal filtration operations are conducted by continually charging a concentrated slurry to the turbulent isothermal filtration zone 10 by way of a charge line 12 and by continually removing a selected portion of the liquid component of the slurry therefrom by filtration through the filter element 16 for discharge through the line 18. A concentrated slurry is discharged from the filter element 10 by way of the line 14.

Filtrate withdrawn by way of line 18 normally passes through three-way valve 22 to the line 24. Preferably, from line 24 the filtrate is routed through manifold 30 and line 38 to the surge drum 42 and from thence by way of lines 44 and 32 to pump 36. Alternatively, the valve 40 in the line 38 may be closed and the valve 34 in the line 32 may be opened whereby the filtrate may be charged directly from manifold 30 to pump 36 by way of the line 32.

From pump 36, the filtrate is discharged by way of the lines 50 to the manifold 54 and from thence by way of line 56 containing flow controller 60 to the high pressure line 48.

As an alternative, the valve 52 in the line 50 may be closed and the valve 62 in the line 64 may be opened whereby the filtrate will be discharged from the pump 36 through lines 50 and 64 to surge drum 66 and from thence by line 68 to manifold 54.

The amount of filtrate withdrawn from the line 18 is primarily controlled by the setting of the valve 58 and this valve is regulated by flow recorder-controller 60.

Thus, if it is desired to operate the filtration zone 10 at a substantially constant pressure drop across the filter element 16, the flow recorder controller 60 may be utilized to actuate the valve 56 in a manner such that progressively less filtrate will be withdrawn as the filtration cycle proceeds and at least partial progressive blinding of the filter element 16 occurs. If a substantially constant rate of filtrate withdrawal is to be maintained, the manner of control of the valve 58 by the controller 60 may be such that a progressively greater opening of the valve 58 occurs. Thus, in accordance with a preferred form of the present invention, the pressure in the line 48 is significantly greater than the pressure in the annulus 20 of the line filter 10 but less than the pressure which can be generated by the pump 36.

In accordance with this embodiment of the present invention, the timer 26 periodically actuates the controls for the valves 22 and 78 in order to open the by-pass lines 70 and 76.

As a result of this operation, filtrate discharged from the pump 36 into the line 50 is, in the main, recycled to the charge line 34 for the pump 36 by way of lines 76 and 82, surge drum 42 and lines 44 and 32.

At the same time, a desired portion of the filtrate, as determined by the setting of the valve 72, flows from the high pressure line 48 by way of lines 56, 70 and 18 to the interior of the filter element 16.

From the interior of the filter element 16, the reversely circulating filtrate passes through the surface of the filter element into the slurry to be filtered. As a consequence, cleansing of the surface of the filter element occurs. The setting of valve 72 provides a back pressure sufficient to permit washing of the filter element 16 but not so high as to cause damage thereto.

It will be understood, of course, that the frequency of backwash, the duration of backwash, and the extent of pressure differential-reversal will vary for particular operating sequences depending on the nature of the material to be slurried, the construction and efficiency of the filter element, etc.

By way of specific example, if the material to be filtered is a slurry of about 5 to 10 volume percent of wax crystals in a solution of dewaxed oil and solvent consisting of the other 90 to 95 percent of the slurry, the normal pressure differential existing across the high pressure side of the filter elements in the annulus 20 to the low pressure side of the filter element in the interior of the filtering element 16 may be within the range of about 9 to 70 p.s.i. for a constant filter rate operation or within the range of about 30 to 70 p.s.i. for a constant pressure drop operation. The pressure within the annulus 20 may be, for example, about 60 p.s.i.

Normally, therefore, the solution of dewaxed oil will tend to flow from the slurry through the surface of the filter element and into the discharge line 18. For a given slurry feed stock composition, a given filter construction, etc., the rate of withdrawal of the solution of dewaxed oil through the line 18 will primarily be determined by the setting of the valve 58. For example, the discharge pressure in the pump discharge line 50 may be within the range of about 180 to 220 p.s.i.g. and preferably about 200 p.s.i.g. and may be caused to work against a back-pressure of about 170 to 210 p.s.i.g., such as 180 p.s.i.g., such that the "net effective" discharge pressure may be about 20 p.s.i.g. (about the maximum encountered in the system into which filtrate is being pumped).

Periodically, and in this situation, once every 15 to 300 minutes, the valves 22 and 78 are actuated by the timer 26 to permit the reverse circulation of filtrate through the line 18 and into the annulus 20. As a consequence, the pressure differential across the element 16 in the line filter 10 will be reversed. This backwashing operation may be continued, for example, for about 5 to 120 seconds per backwash, whereby the surface of the filter element 16 may be maintained substantially free from blinding materials such as finely divided particles, etc.

The pump 36 will continue to operate during backwash operations. In this instance, however, filtrate discharged into the line 50 by pump 36 will be recycled to the pump charge line 32, as shown.

Having described our invention, what is claimed is:

1. In an apparatus for turbulently filtering a suspension of a finely divided solid in a liquid to obtain a concentrated slurry fraction and a liquid filtrate fraction by creating a pressure differential across a filter element in a filter zone to permit selective passage of liquid components of said slurry through said filter element, wherein said concentrated slurry fraction is continually withdrawn from said filter zone, wherein said thus-obtained filtrate fraction is withdrawn from said filter zone through a filtrate discharge line and wherein said filtrate discharge line is interconnected with a conduit having a pressure sufficient to reverse the normal pressure differential across said filter element, the improvement which comprises pump means in said filtrate discharge line for overcoming the said pressure differential in said conduit, pump-around means interconnecting the discharge portion of said pump means with the inlet portion thereof, a filtrate recycle line regulated by a normally closed valve interconnecting said conduit with said filtrate withdrawal line and valve actuating means coupled with the valve in said filtrate recycle line for periodically opening said valve for limited periods of time whereby said pump means is periodically by-passed while continuing to operate and whereby filtrate is forced backwardly through said filter element by the pressure of liquid material in said conduit into said concentrated slurry fraction for withdrawal therewith from said filter zone.

2. A method for obtaining a liquid filtrate fraction from a slurry feed containing a finely divided solid in a liquid medium which comprises continuously turbulently flowing said slurry feed across one surface of a filter element in a filter zone, normally creating a pressure differential between said one surface of said filter element and the other surface of said filter element to cause selective withdrawal of a portion of the liquid component of said slurry feed through said filter element to thereby resolve said slurry feed into a concentrated slurry fraction and a filtrate fraction, continuously withdrawing said concentrated slurry fraction from said filter zone through a concentrated slurry outlet, normally continually withdrawing said filtrate fraction from said filtration zone, and discharging said filtrate fraction into a zone containing filtrate at a pressure higher than that in said filtration zone but less than that attainable in creating said pressure differential, periodically interrupting said normal continual filtrate withdrawal while maintaining said slurry feed undiminished by circulating a portion of said filtrate in a diverted path and allowing the backflow of filtrate from said high pressure zone in a reverse direction into said filtration zone, and withdrawing all of said slurry feed and all of said backflow filtrate portion only through said concentrated slurry outlet during said reverse flow, whereby blinding in said filtration zone is minimized.

References Cited in the file of this patent

UNITED STATES PATENTS

| | | |
|---|---|---|
| 1,262,146 | Ward | Apr. 9, 1918 |
| 2,779,477 | Swenson | Jan. 29, 1957 |

OTHER REFERENCES

Bruins et al.: Abstract of application Serial Number 770,212, published September 2, 1952.